(12) United States Patent
Ishikawa

(10) Patent No.: US 8,179,868 B2
(45) Date of Patent: May 15, 2012

(54) SITE DIVERSITY OPERATING METHOD AND PROGRAM

(75) Inventor: Kazunori Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1303 days.

(21) Appl. No.: 11/475,092

(22) Filed: Jun. 27, 2006

(65) Prior Publication Data

US 2007/0072560 A1    Mar. 29, 2007

(30) Foreign Application Priority Data

Jul. 7, 2005   (JP) ................................ 2005-199238

(51) Int. Cl.
*H04B 7/212* (2006.01)

(52) U.S. Cl. ........................................................ 370/337

(58) Field of Classification Search .................... 370/337
See application file for complete search history.

(56) References Cited

U.S. PATENT DOCUMENTS

| | | | | |
|---|---|---|---|---|
| 4,128,835 A | * | 12/1978 | Russell | 342/46 |
| 5,640,452 A | * | 6/1997 | Murphy | 380/258 |
| 6,522,888 B1 | * | 2/2003 | Garceran et al. | 455/456.3 |
| 7,065,374 B2 | * | 6/2006 | Lipp et al. | 455/502 |
| 7,221,290 B2 | * | 5/2007 | Burgemeister | 340/945 |
| 7,313,143 B1 | * | 12/2007 | Bruno | 370/395.4 |

FOREIGN PATENT DOCUMENTS

| | | |
|---|---|---|
| JP | 3262218 A | 11/1991 |
| JP | 10135898 A | 5/1998 |
| JP | 2001136555 A | 5/2001 |

OTHER PUBLICATIONS

Kitaori Jun et. al. "The Fundamental Experiments of VHF Digital Link Mode 3 System" Electronic Navigation Research Institute Papers, ISSN 1341-9102, No. 108, issued Jan. 16, 2004.
Matsukubo, et al., "VDL Mode 3 Sougo Unyousei Oyobi Kansei Hyouka Jikken," Navigatgion Research Institute 5th Meeting for Reading Research Papers, Jun. 2005, Japan.

* cited by examiner

*Primary Examiner* — Marivelisse Santiago Cordero
(74) *Attorney, Agent, or Firm* — Sughrue Mion, PLLC

(57) ABSTRACT

In a site diversity operating method in which a channel is divided into a plurality of slots by time division multiple access, and voice and data are transmitted between controlling stations and controlled stations via a plurality of sites through the slots whereby controlled stations are controlled based on instructions from controlling stations, a site change message indicating that the controlled station has changed the site is transmitted from the controlled station to the controlling station, and based on the transmitted information, a step of searching for the current site is performed on the controlling station side.

7 Claims, 13 Drawing Sheets

FIG. 13

| OCTET | BIT NO. | FIELD |
|---|---|---|
| 5 | 5 | EMERGENCY DOWNLINK REQUEST SERVICE |
| 5 | 6 | SITE DIVERSITY SERVICE |
| 5 | 7~8 | SPARE |
| 6 | 1~8 | SPARE |

SITE DIVERSITY OPERATING METHOD AND PROGRAM

BACKGROUND OF THE INVENTION

1. Field of the Invention

The present invention relates to a site diversity operating method, and for example, to a site diversity operating method in a VDL Mode 3 system which is to be introduced into air traffic control services.

2. Related Art

For example, air traffic control services are currently carried out based on remote communications using analog voice communications, that is, so-called radio communications. Frequencies allocated to air traffic control internationally, within the VHF (Very High Frequency) band, are 118 to 137 MHz, which are divided into a plurality of channels. However, as demands for aviation communications increase in recent years, a trouble may be caused in the air traffic control due to the number of channels being in short.

In view of the above, there has been proposed a VHF digital link (VDL) system which substitutes for the analog voice communications. The VHF digital link is a next generation communication system, and standardizing operation for the system has been carried out in the ICAO (International Civil Aviation Organization).

As a VHF digital link, VDL Mode 3 has been standardized. VDL Mode 3 is a system substituting for the current radio communications, in which voice and data are digitally exchanged bi-directionally in addition to analog voice communications.

In performing site diversity operation in the VDL Mode 3, it is required to utilize the characteristics of the VDL Mode 3 as much as possible in such a situation that an operating mode similar to the analog ground-to-air radio system currently introduced is desired. For example, in order to conform to the operation of analog ground-to-air radio system, voice transmission from an air traffic controller is performed only from a ground site selected by the air traffic controller. For voice reception, there is required a system for superposing voice received from all ground sites and transmitting voice receivable as much as possible to air traffic controllers. In order to utilize the characteristics of the VDL Mode 3, it is required to surely provide services such as data link communications, voice source identification, an anti-blocking function and an air traffic controller priority voice without a waste, which become possible in addition to the conventional voice service.

Non-patent Document: The Fundamental Experiments of VHF Digital Link Mode 3 System (Electronic Navigation Research Institute Papers, ISSN 1341-9102, No. 108, issued on Jan. 16, 2004)

In providing these services, a control of beacon signals called management burst outputted from ground sites is deeply involved. In the case of site diversity operation, however, a plurality of ground sites for transmission and reception are provided and service provision is maintained while sharing the same frequency, so the management burst itself must be transmitted in a time dividing manner. Therefore, temporal delay is caused due to the positional relationship between aircrafts and ground sites.

Originally, a VDL Mode 3 system is not designed to take into account a delay problem of management burst caused in the case of controlling a plurality of ground sites like site diversity operation. It is only recently that an algorithm of management burst by site diversity and draft revisions of manuals considering delay problem of management burst are under preparation partially.

However, for practical operation, it is required to consider problems in management burst control and problems when transmitters and receivers are separated into plural devices, and to take measures against the problems.

SUMMARY OF THE INVENTION

It is therefore an object of the present invention to provide a site diversity operating method and a program capable of operating VDL Mode 3 in an operating mode similar to that of the analog communications currently in use.

In order to achieve the object, a site diversity operating method according to the present invention is a method in which a channel is divided into a plurality of slots by time division multiple access, and voice and data are transmitted between controlling stations and controlled stations via a plurality of sites through the slots whereby controlled stations are controlled based on instructions from controlling stations. The method comprises a site searching step for transmitting, from the controlled station to the controlling station, a site change message indicating that the controlled station has changed a site, and based on the transmitted information, searching for the current site on the controlling station side.

In the present invention, when a controlled station has changed a site, the controlled station transmits a site change message to the controlling station indicating that it has changed the site. Based on the site change message from the controlled station, the controlling station searches for the current site to which the controlled station is newly linked.

The method may be so configured that site identification codes are assigned to the sites, and based on the site identification codes, the controlled stations are controlled by the site unit.

Further, the method may be so configured that a voice receiving squelch window of the controlled station is expanded, and a signal transmitted from the controlling station via a site having a different site identification code is received by the controlled station, whereby timing that the controlled station links the controlling station is changed. In this case, it is desirable that when the controlled station receives a signal from the site having the different site identification code, the controlled station transmit a site change message to the controlling station indicating that it has changed the site.

Identification of a site diversity operation may be performed by a support option message used for linking the controlling station and the controlled station.

Further, when the site diversity operation is performed in an area where radio wave covering areas of the plurality of sites are overlapped, voice transmission from the controlled station to the controlling station may be prioritized, and a transmission suppressing step for suppressing voice transmission may be performed corresponding to the priority. In this case, in the transmission suppressing step, it is desirable that the priority be set corresponding to whether voice communications from the controlled station to the controlling station having started, and only voice transmission of high priority is allowed and voice transmission of low priority is suppressed.

A site diversity operating program according to the present invention is a program for prompting a computer to perform a site diversity operation in which a channel is divided into a plurality of slots by time division multiple access, and voice and data are transmitted between controlling stations and controlled stations via a plurality of sites through the slots whereby controlled stations are controlled based on instructions from controlling stations. The program is so configured as to prompt a computer by electric signals to execute a function of transmitting, from the controlled station to the controlling station, a site change message indicating that the controlled station has changed the site, and based on the transmitted information, searching for the current site on the controlling station side.

The site diversity operating program may be so configured as to prompt a computer by electric signals to execute a functions of expanding a voice receiving squelch window of the controlled station, receiving a signal transmitted from the controlling station via a site having a different site identification code by the controlled station, and changing timing that the controlled station links to the controlling station. In this case, it is desirable to prompt the computer by electric signals to execute a function of transmitting, from the controlled station to the controlled station, a site change message indicating that the controlled station has changed the site, when the controlled station receives a signal from the site having the different site identification code.

EFFECTS OF THE INVENTION

As described above, according to the present invention, it is possible to perform an operation effective for site diversity, and to solve a problem of delay in communications between controlling stations and controlled stations.

Further, in the site diversity operation, site identification codes are distinguished by a site, thereby controlled stations can be controlled by the site unit. Further, the controlled station expands a voice receiving squelch window so as to always receive signals from different sites to thereby perform a site change, so it is capable of synchronizing with a site near the controlled station at any time. Therefore, by expanding the voice receiving squelch window value of the controlled station, it is possible to receive voice from a site other than the current site.

If a voice signal from a different site is received, it is possible to know the current site of the controlled station on the controlling station side by transmitting a site change message indicating that the current site has been changed.

Further, it is possible to prevent a false synchronization beacon signal from being received at the time of single site by performing identification of the site diversity operation with a support option message.

Further, by making the site diversity operating method into a program, it is possible to execute the site diversity operation in existing equipment by installing the program into a computer managing the existing equipment.

BRIEF DESCRIPTION OF THE DRAWINGS

FIG. 13 is a diagram for explaining identification of a site diversity operation.

DESCRIPTION OF PREFERRED EMBODIMENT

Hereinafter, an embodiment of the present invention will be explained based on the drawings.

An embodiment of the present invention is basically so configured that, in a site diversity operating method in which a channel is divided into a plurality of slots by time division multiple access, and voice and data are transmitted between controlling stations and controlled stations via a plurality of sites through these slots whereby controlled stations are controlled based on instructions from controlling stations, a controlled station transmits, to a controlling station, a site change massage indicating that the controlled station has changed the site, and based on the transmitted information, the controlling station searches for the current site.

Further, it is also acceptable that a voice receiving squelch window of the controlled station is expanded, and a signal transmitted from the controlling station via a site having a different site identification code is received by the controlled station, whereby timing that the controlled station links the controlling station is changed. In this case, it is desirable that when the controlled station receives a signal from the site having the different site identification code, a site change message indicating that the site has been changed be transmitted from the controlled station to the controlling station.

Next, the embodiment of the present invention will be explained in detail by raising problems when the site diversity operating method according to the embodiment of the present invention is applied to air traffic control services in an operating mode similar to that of the analog ground-to-air radio system currently introduced, and by clearly describing measures against the problems.

Figure 1:
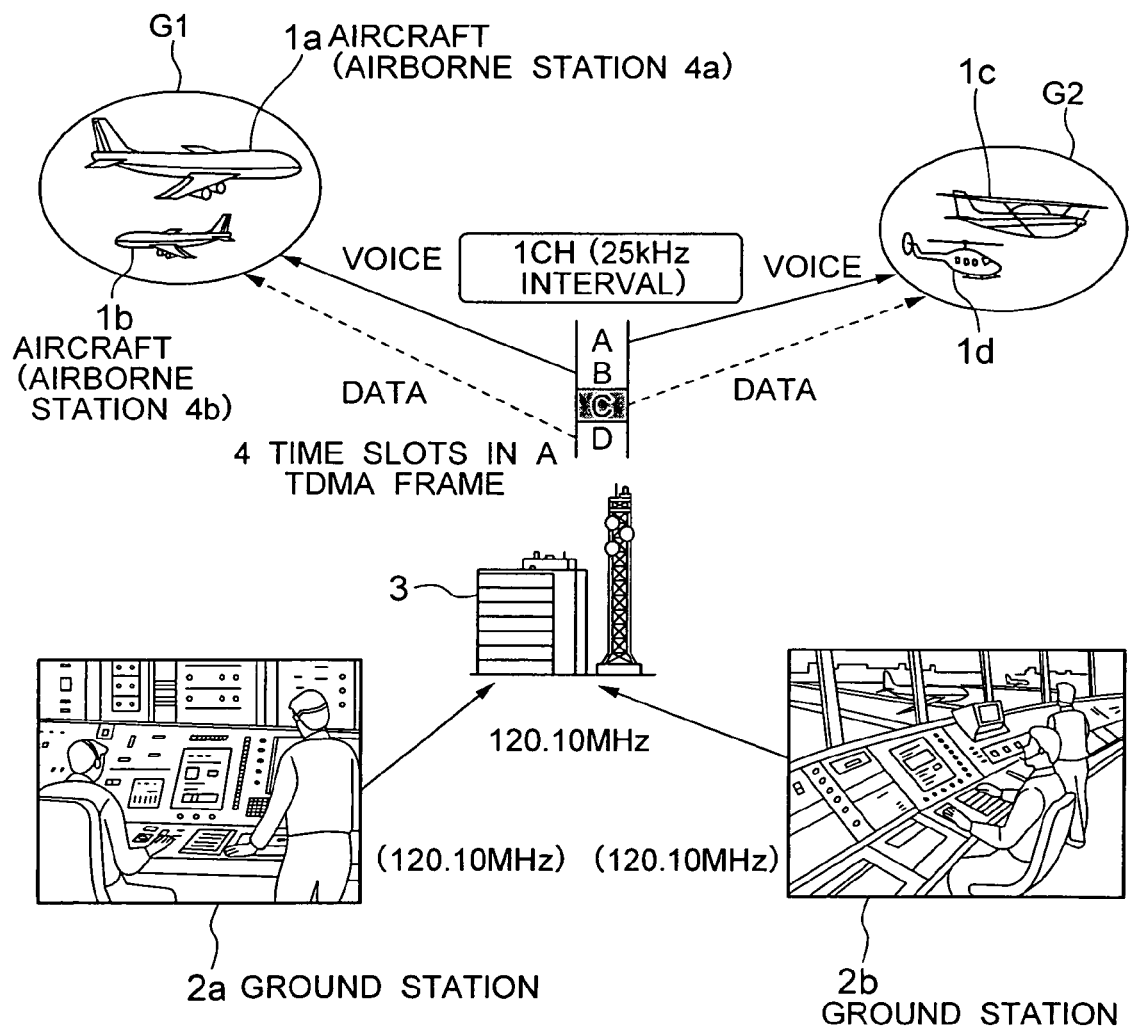
FIG. 1 is a configuration diagram showing a VDL Mode 3 system according to an embodiment of the present invention.

First, a VDL Mode 3 system will be explained based on FIG. 1. As shown in FIG. 1, in VDL Mode 3, one channel is divided into four slots (A, B, C, D) by time division multiple access (TDMA), and the respective slots are operated by being allocated for voice and data corresponding to the operational mode of the airspace.

Explanation will be given more specifically. As shown in FIG. 1, aircrafts 1 (1a, 1b, 1c, 1d) flying an airspace are recognized by being divided into two groups G1 and G2, for example. Between airborne stations 4a and 4b (airborne radios) loaded in the aircrafts 1a and 1b of the group G1 and a ground station 2a, and between airborne stations (airborne radios) loaded in the aircrafts 1c and 1d of the group G2 and a ground station 2b, separate links of digital voice and data communications are set by one radio provided to one ground site 3, whereby the aircrafts 1 are operated under the air traffic controls of the respective ground stations 2a and 2b. In the example shown in FIG. 1, one channel is divided into four slots, and two slots thereof are used as channels for transmitting information of digital voice, and the remaining slots are used as channels for transmitting information of digital data, so this system is called a 2V2D system. Note that slot division by TDMA is not limited to the 2V2D system. Here, the ground station 2*a* serves as a controlling station and the airborne stations 4*a* and 4*b* serve as controlled stations.

Figure 3:
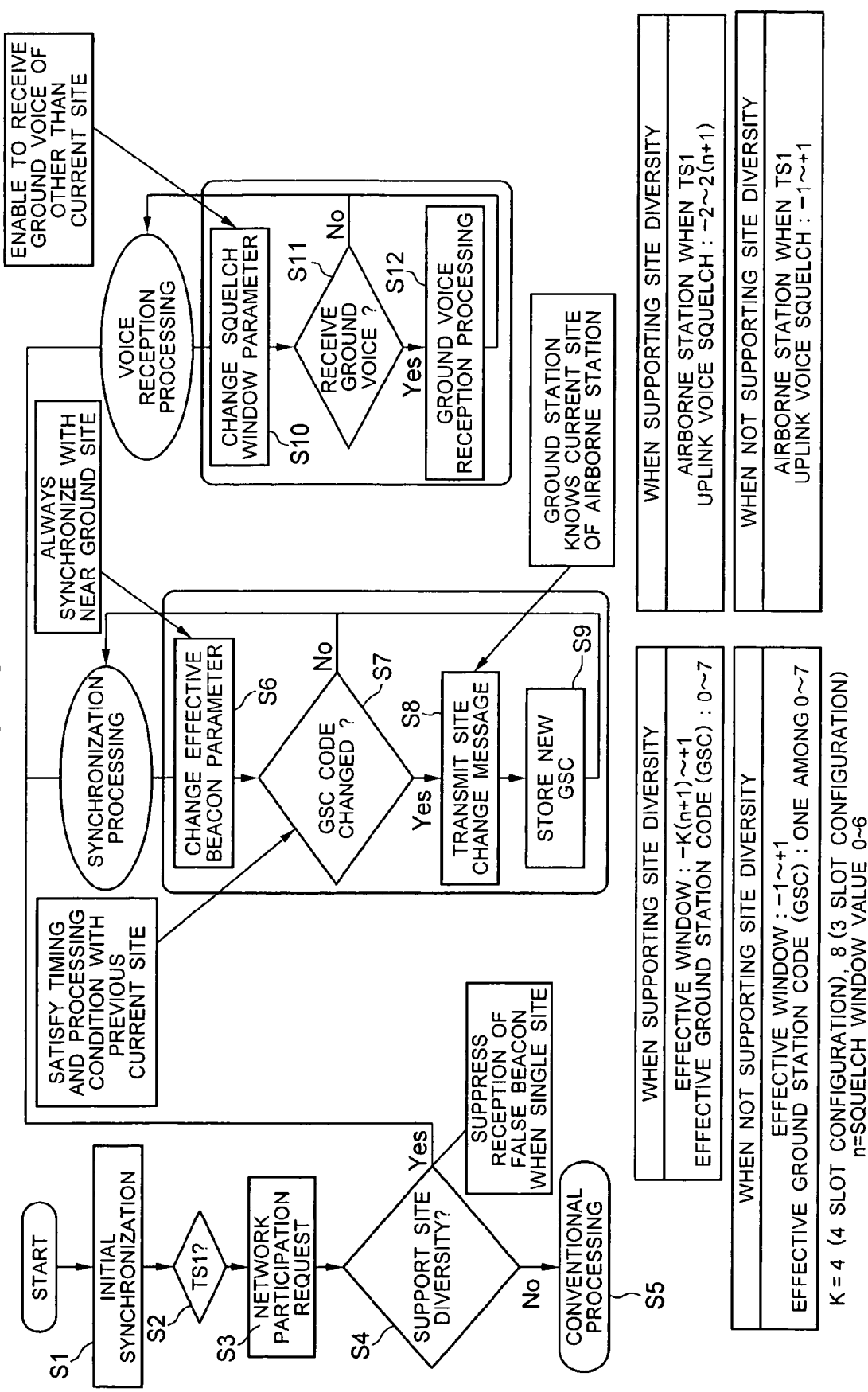
FIG. 3 is a flowchart showing processing in the embodiment of the present invention.

Further, between the airborne stations 4*a* and 4*b* of the aircrafts 1*a* and 1*b* and the ground station 2*a*, a sequence of participating in a network including a support option message is carried out. More specifically, as shown in FIG. 3, initial synchronization processing is performed between the ground station 2 and the airborne stations 4*a* and 4*b* (step S1). When the timing status of the airborne stations 4*a* and 4*b* is TS1 (step S2), network participating requests are outputted from the airborne stations 4*a* and 4*b* to the ground station 2 via the ground site 3 (step S3). The ground station 2 determines whether the airborne stations 4*a* and 4*b* support site diversity (step S4), and if they do not support site diversity, the ground station 2 causes them to perform conventional processing by an operation other than site diversity (step S4; NO, Step S5).

If they support site diversity (step S4; YES), the ground station 2 allows coming aircrafts 1 to participate in a network (link) by the site diversity operation. When the network participation ends, the aircrafts 1 are under control of the ground station 2, so they fly the airspace according to the control of the ground station 2.

Figure 2:
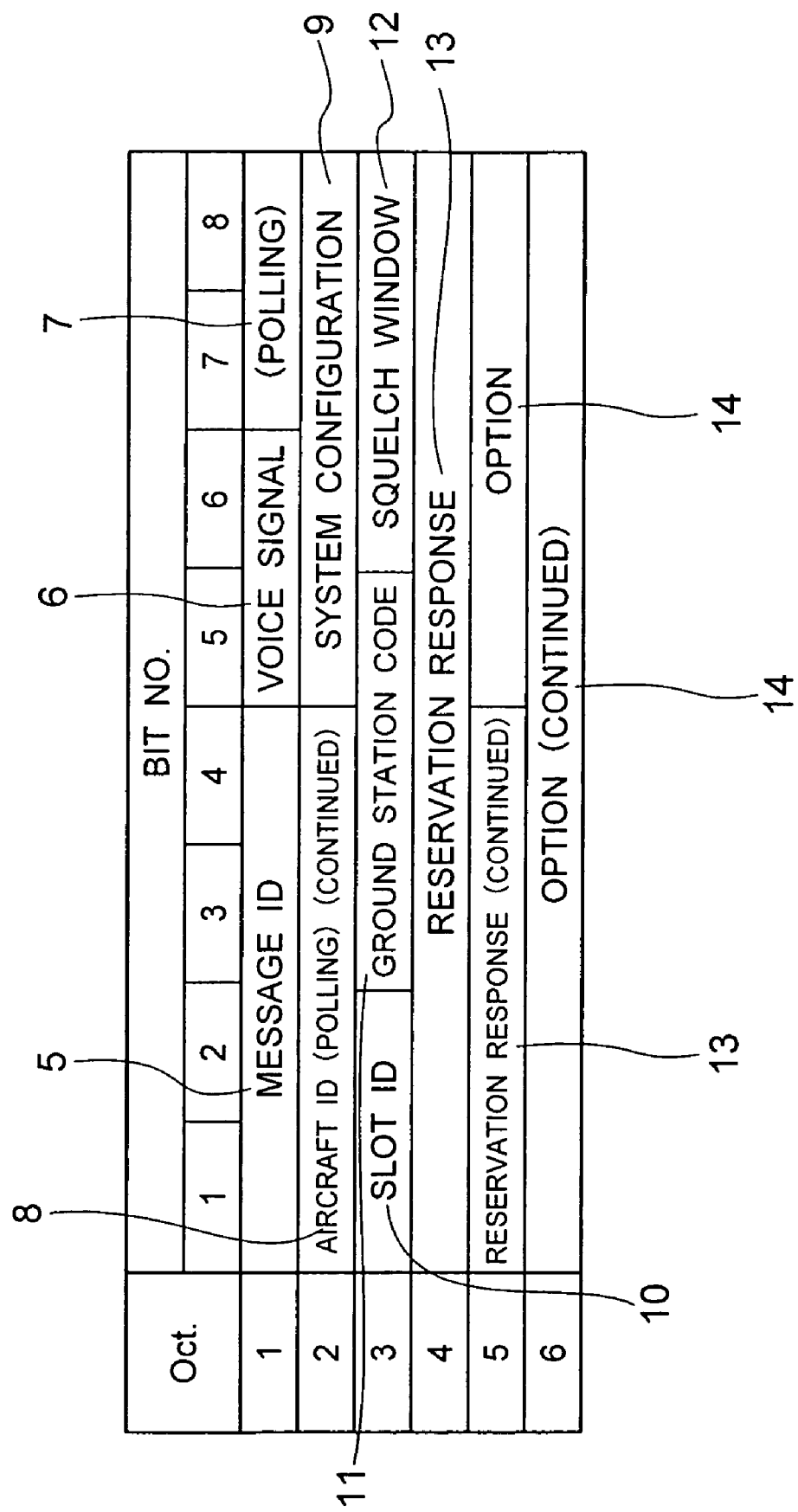
FIG. 2 is a diagram showing the format of a support option message.

FIG. 2 shows the format of the support option message. As shown in FIG. 2, the format of a support option message is defined by the ICAO manual, and has a format configuration in which an octet consisting of 8 bits is used as a unit of information amount, and a message is formed of a hierarchical structure of 6 octets. The vertical direction of the diagram shown in FIG. 2 shows a hierarchical structure consisting of 6 octets, and the horizontal direction shows the bit number.

Octet 1 includes: information 5 of a message ID 5 showing a support option message consisting of 4 bits; information 6 of voice signals showing a voice occupied notification consisting of 2 bits; and transmission information 7 and 8 of polling consisting of 6 bits. Octet 2 includes: the polling information 8; and information 9 of a system configuration consisting of 4 bits. Octet 3 includes: slot ID information 10 for recognizing a slot divided by TDMA consisting of 2 bits; information 11 of a ground station code (GSC) allocated for each ground site 3 consisting of 3 bits; and information 12 showing a squelch window value of an airborne radio consisting of 2 bits. Octet 4 includes: reservation response information 13 for responding to reservation assignment from the ground site 3 consisting of 12 bits. Octet 5 includes: a part of the reservation response information 13 consisting of 4 bits; and option information 14 consisting of 12 bits. Octet 6 includes a part of the option information 14 consisting of 8 bits.

Here, ground station codes (GSC) are used for identifying ground station networks so as not to cause a false synchronization with another ground station in a different airspace of the same frequency existing within the radio covering area after participating in the network. Therefore, although it is a site diversity operation originally, it is considered as one ground station network, and the ground station code is desirably the same. However, in the site diversity operation, burst transmission will never be performed from two or more ground sites 3 simultaneously in the same network, so from the viewpoint of the object of ground station code (GSC), there is no problem even if ground station codes of the ground stations 3*a*, 3*b* and 3*c* are different. In the site diversity operation, a plurality of ground sites 3 are identified by assigning separate ground station codes (GSC) to ground sites 3 in the same network (site diversity group). Currently, six ground sites 3 are scheduled to be operated at most. Therefore, it is possible to identify ground sites 3 by identifying effective ground station codes (GSC) of 0 to 7.

Next, a current site problem will be considered. A system timing of an airborne radio loaded on an aircraft, when the power of a radio system is turned on or immediately after a frequency change, is in the status of TS0. In the VDL Mode 3, synchronizing status is called timing status (TS). Services which can be provided are different depending on the timing status. Timing status includes four statuses from TS0 to TS3, and it is only the timing status TS1 in which all services are possible. Therefore, an airborne radio tries to detect a beacon signal from the ground site 3 so as to be in the timing status TS1.

An airborne radio, which is in the timing status TS1 by synchronizing with the beacon signal from a ground site, only receives a beacon signal from the ground site which is received within ±1 symbol of the reference timing as an effective beacon signal. The effective beacon signal is defined as a current beacon, and the ground site which outputs the effective beacon signal is defined as a current site.

An airborne radio will not receive any beacon signal from a ground site, other than current beacons, not reached within ±1 symbol. However, in the case where any beacon signal from a ground site cannot be received in a period of a 24 MAC (media access control) cycle (CTC1>24) or more, it is possible to expand the effective window value of ±1 symbol to a range of $-K(n+1)$ to +1 at any time. In the maximum covering area 200NM in the standard range of 2V2D, K=4 and n=6 are given respectively, so $-28$ to $+1$ symbols become effective window values.

An object of performing operation for expanding the effective window value of ±1 symbol on the airborne radio side described above is to synchronize the airborne radio with a beacon signal from a ground site of the closest possible while causing the airborne radio to maintain the timing status TS1 (up to CTC1≦50).

When receiving the current beacon outputted from the ground site 3, the airborne radio of the aircraft 1 is in the timing status TS1 so as to be in an initial synchronizing state, and in order to receive all services, it is required to obtain an airborne station ID (aircraft ID or local user ID) after initial synchronization. An airborne station ID is assigned by the ground station 2 to the aircraft 1 which is the subject of air traffic control when a network (link) is established for information transmission between the aircraft 1 and the ground station 2 via the ground site 3 through the network participation sequence. Note that the network participating sequence includes the support option message shown in FIG. 2.

When the aircraft 1 which is the subject of air traffic control obtains an airborne station ID from the ground station 2, the airborne station ID is held by the airborne radio of the aircraft 1. With the airborne radio holding the airborne station ID, it is possible to provide a peer-to-peer data communication service and to identify the voice source. Here, a state where the airborne radio of the aircraft 1 obtains the airborne station ID and is connected with the ground station 2 is defined as a linked state.

When the linked state is established between the airborne stations 4*a* and 4*b* of the aircrafts 1 and the ground station 2, the linked state is kept confirmed between each other regularly. This is called a polling sequence, in which polling is performed regularly from the ground station 2 to the airborne stations 4*a* and 4*b* at the minimum interval of 6 seconds (25 MAC), and the airborne stations 4*a* and 4*b* respond to the polling from the ground station 2.

When the ground site 3 transmitting polling signals is the current site for the airborne stations 4*a* and 4*b*, the airborne stations 4*a* and 4*b* output polling response signals to the ground site 3 which is the current site. On the other hand, if beacon signals outputted from the ground site 3 are received exceeding the effective window value of ±1 symbol, the ground site 3 is not the current site for the airborne stations 4a and 4b, so the airborne stations 4a and 4b will not respond to the polling from the ground station 2.

A case where the airborne stations 4a and 4b do not respond to the polling from the ground station 2 actually happens when the airborne stations 4 change the ground site within the same network by the site diversity operation. That is, explained by using FIG. 4 as an example, it is when the aircraft 1 moves from the ground site 3a to the next ground site 3b and cannot receive a beacon signal from the ground site 3a and satisfies the condition of CTC1>24 (CTC1 is a count value of an effective beacon signal, and if there is no effective beacon, it increases by +1 in 1 MAC, and if it is an effective beacon in contrast, it is reset to "0"), the current beacon source is changed from the ground site 3a to the ground site 3b.

Figure 4:
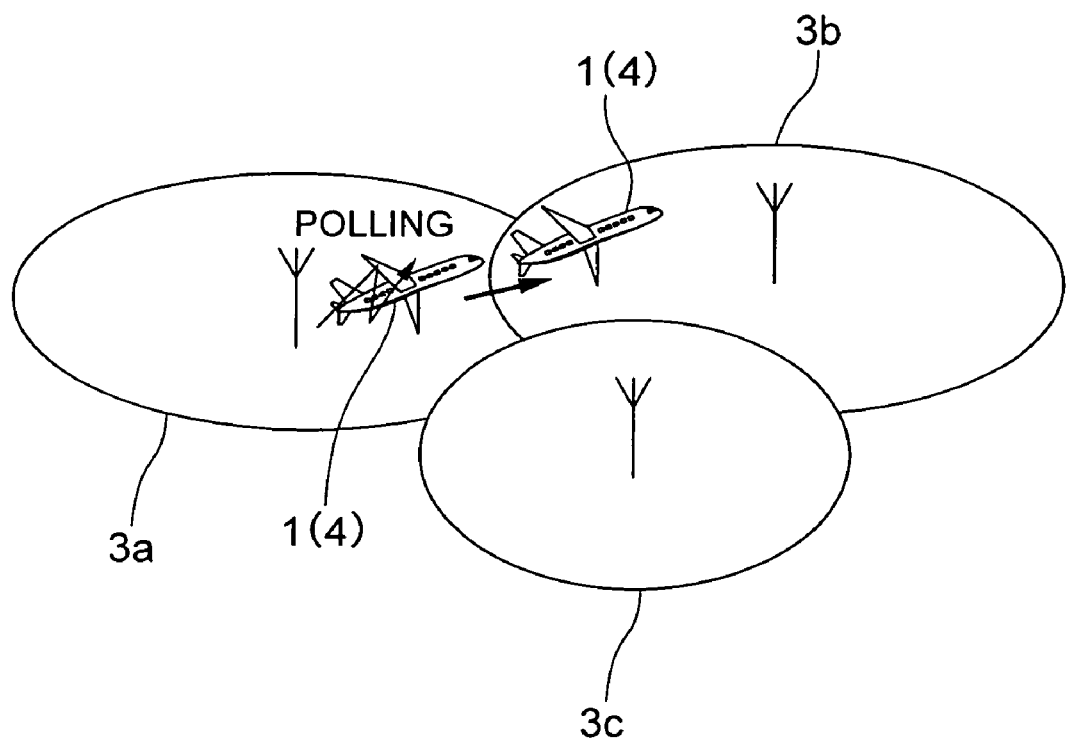
FIG. 4 is an illustration for explaining a site change in site diversity.

In FIG. 4, if the distance between the position of the airborne station 4 within the ground site 3a and the position of the airborne station 4 within the ground site 3b to which the aircraft 1 moves exceeds 15 NM, the timing change exceeds ±1 symbol, so the effective window of the airborne station 4 will be changed relatively from that before 1 MAC.

In the ground station 2 side, there is no means to know that the current site, where the aircraft which is the subject of air traffic control locates, has been changed from the ground site 3a to the ground site 3b. In the state where the airborne station 4 has changed the ground site, even though the ground station 2 performs polling transmission from the ground site 3a which was the current site with respect to the airborne station 4 before the change, no polling response will come from the airborne station 4, so it cannot know which ground site is the optimum to be used as the ground site 3 for the next polling transmission.

The ground station 2 can obtain a clue for recognizing the optimum ground site only when the airborne station 4, which is the subject of air traffic control, downlinks a message to the ground station 2 and the ground station 2 receives it.

By receiving a message from the airborne station 4, several ground sites 3 become candidates for the current site, and assumption can be made therefrom. For example, a ground site which seems to be the optimum is determined based on information that the receiving level of the downlink signal from the airborne station 4 is seemed to be a receiving level of the optimum ground site, or information that the ground site receives the downlink signal at the earliest timing.

However, this method is just an assumption. If there are a plurality of candidates for the optimum ground site 3, the optimum ground site cannot be specified.

The count value NL2 for completing polling transmission from the ground station 2 to the airborne station 4 is set to three times, generally. In the site diversity operation, six ground sites are intended at a maximum, so even if the ground station 2 transmits polling signals in a blind way from six ground sites 3 sequentially, it is impossible to complete polling transmission from all ground sites 3 within a count value set for completing polling transmission, so it is expected that a link between the ground station 2 and the airborne station 4 will be disconnected.

Here, it may be possible to increase the count value NL2 for completing polling transmission by the ground station 2 corresponding to the number of ground sites 3 of the site diversity operation.

However, if the number of aircrafts 1 which are subjects of air traffic control by the ground station 2 is set to 60 at most, this method is same as allowing polling delay up to 60*6 (ground sites)=360 MAC cycles (86.4 seconds) at a maximum. This is not only inefficient for air traffic control services but also ineffective for the purpose of polling which enables to reserve and allocate data transmission requests between the ground station 2 and the airborne stations 4 equally to the respective airborne stations 4 in addition to maintaining links between the ground station 2 and the airborne stations 4.

Therefore, on the ground station 2 side, it is required to grasp that which ground site is the current site for the aircraft 1 loading the airborne station 4 which is the subject of air traffic control so as to enable polling without a waste. This is defined as a current site problem.

Next, measures against the current site problem will be explained. In the embodiment of the present invention, two methods are found as measures against the current site problem through the technical analysis described above. One of the measures is a method of knowing a current site, and the other one is a method of reviewing the effective window value of an airborne station 4, that is, an airborne radio. A method of reviewing the effective window value of an airborne radio as an airborne station 4 will be explained later.

(Method of Knowing a Current Site)

The embodiment of the present invention focuses on the fact that it is the airborne station 4 that knows the ground site 3 has been changed first. That is, when the current site has been changed to the next ground site 3, if the airborne station 4 cannot receive a beacon signal from the previous current site within ±1 symbol of the timing of the airborne station 4 generated on the basis of the current site, the airborne station 4 will not reply a polling response to the ground station 2.

In view of the above, in the embodiment of the present invention, the airborne station 4 transmits a message indicating that it has changed the current site to another ground site 3 to the ground station 2, provided that beacon signals from the previous current site cannot be received within ±1 symbol and response processing with the ground station 2 has ended. The reason why a condition that a beacon signal cannot be received within ±1 symbol is included is to prevent this processing from being performed frequently when the difference in distances between the aircraft 1 and two or more ground sites 3 is within 15 NM. Further, in the state of waiting response processing with the ground station, the response processing may be transmitted from the previous current site.

Explanation will be given more specifically. As shown in FIG. 3, the airborne station 4 treats a beacon signal from the nearest ground site 3 as effective in the site diversity operation processing. Therefore, parameter change of the effective beacon is performed (step S6), and timing and message status of an effective beacon from the ground site 3 are monitored, and when the effective beacon is received, the ground station code (GSC) assigned to the ground site 3 is compared with the GSC which has been stored (step S7). If the ground station code (GSC) has not been changed (step S7; NO), parameter change of the effective beacon is performed again. In FIG. 3, parameter change of the effective beacon signal (step S6) is performed for synchronizing the airborne station 4 with a ground site near the airborne station 4 at any time.

If the conditions of the current site change are satisfied and the ground station code (GSC) has been changed (step S7; YES), the airborne station 4 includes information of the changed ground station code (GSC) in a downlink message, and transmits a site change message MSG to the ground station 2 via the ground site 3 (step S8).

Figure 6:
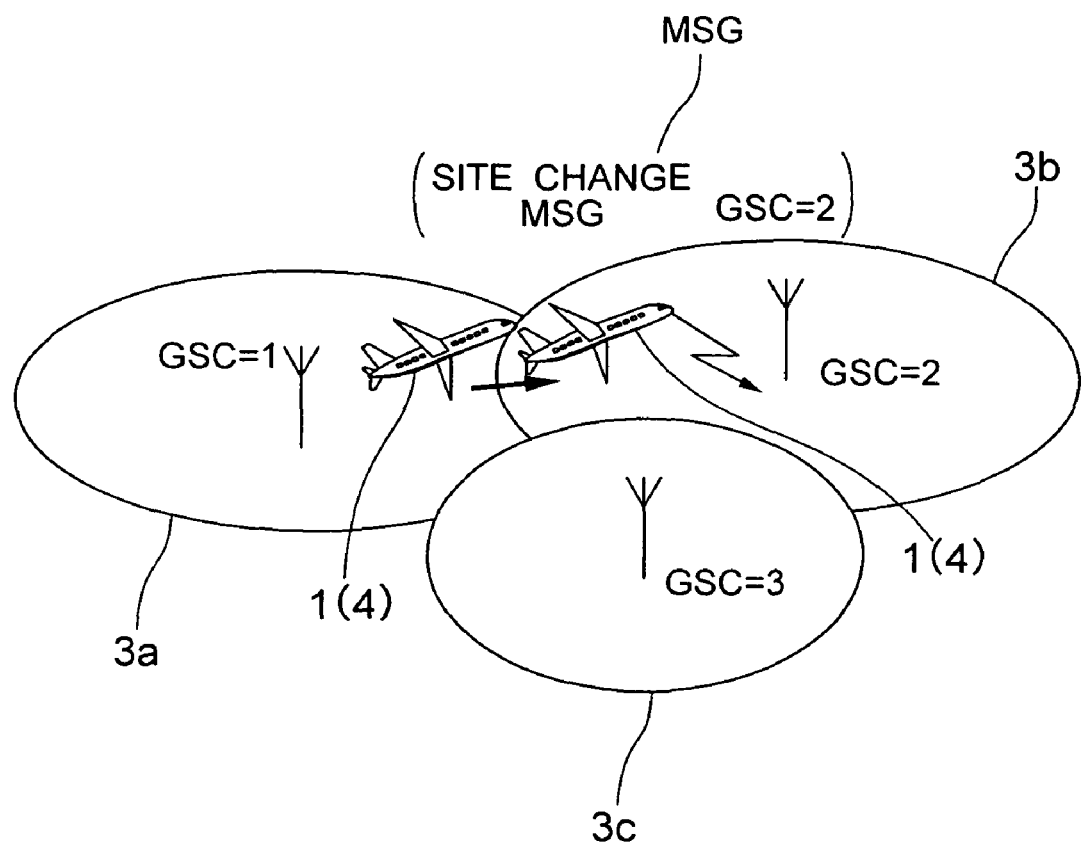
FIG. 6 is an illustration for explaining assignment of ground station codes.

When receiving the downlink message MSG from the airborne station 4 side, the ground station 2 extracts information about the ground station code from the massage. As shown in FIG. 6, ground station codes GSC1, GSC2, GSC3 . . . are assigned to ground sites 3a, 3b, 3c . . . . Therefore, when the airborne station 4 moves to the airspace of the ground site 3b and downlinks a site change message MSG, the site change message MSG from the airborne station 4 reaches the ground station 2 via the ground site 3b, so the ground station 2 recognizes that the airborne station 4 has changed the ground site to the ground site 3b.

Figure 5:
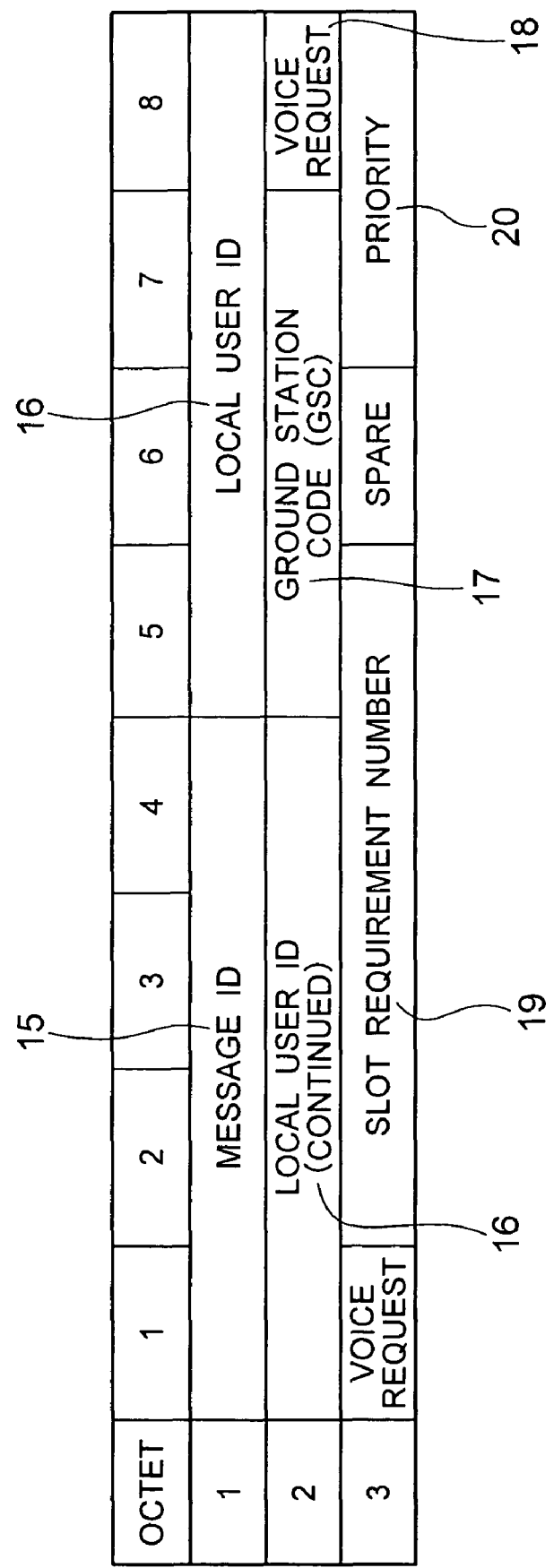
FIG. 5 is a diagram showing the format of a downlink message.

FIG. 5 shows the format for transmitting a downlink message when the airborne station 4 transmits the site change message.

When the airborne station 4 transmits a downlink message, the airborne station 4 has participated in the network (link) with the ground station 2 through a network participating request. Therefore, in the format of the downlink message, information of a ground station code (GSC) 5 is used, except data of network participating request, as shown in FIG. 5.

As shown in FIG. 5, the format of the downlink message has a hierarchical structure of three layers. The format is so set that the first layer includes information of: a message ID 15 indicating a site change message; and a local user ID (airborne station ID) 16 assigned to the airborne station 4 which downlinks the site change message, the second layer includes information of: a part of the local user ID 16; and a ground station code 17 allocated to the current site after the change; and a voice request 18 from the airborne station 4, and the third layer includes information of: a part of the voice request 18; a slot requesting number 19 for requesting the number of slots (slots divided by TDMA) number for performing data transmission; and the priority 20 for data transmission reservation.

Therefore, the airborne station 4 downlinks a downlink message to the ground site 3b based on the downlink message format shown in FIG. 5, and transmits a ground site change message (site change message) to the ground station 2.

When the downlink message is received, priority processing of beacon transmission is updated. The priority processing of beacon transmission is processing for determining a ground site to which the next transmission will be performed, which includes beacon transmission for the initial synchronization, response to allocation of data reservation, the polling transmission, and message processing such as voice occupied notification described later. Therefore, due to the site change message, beacon transmission to the airborne station 4 which will transmit or respond next time is transmitted from the ground site identified as the current site by the ground station 2. This site change message is also processed similarly for voice or data to the airborne station 4, not only for beacon transmission.

Figure 7:
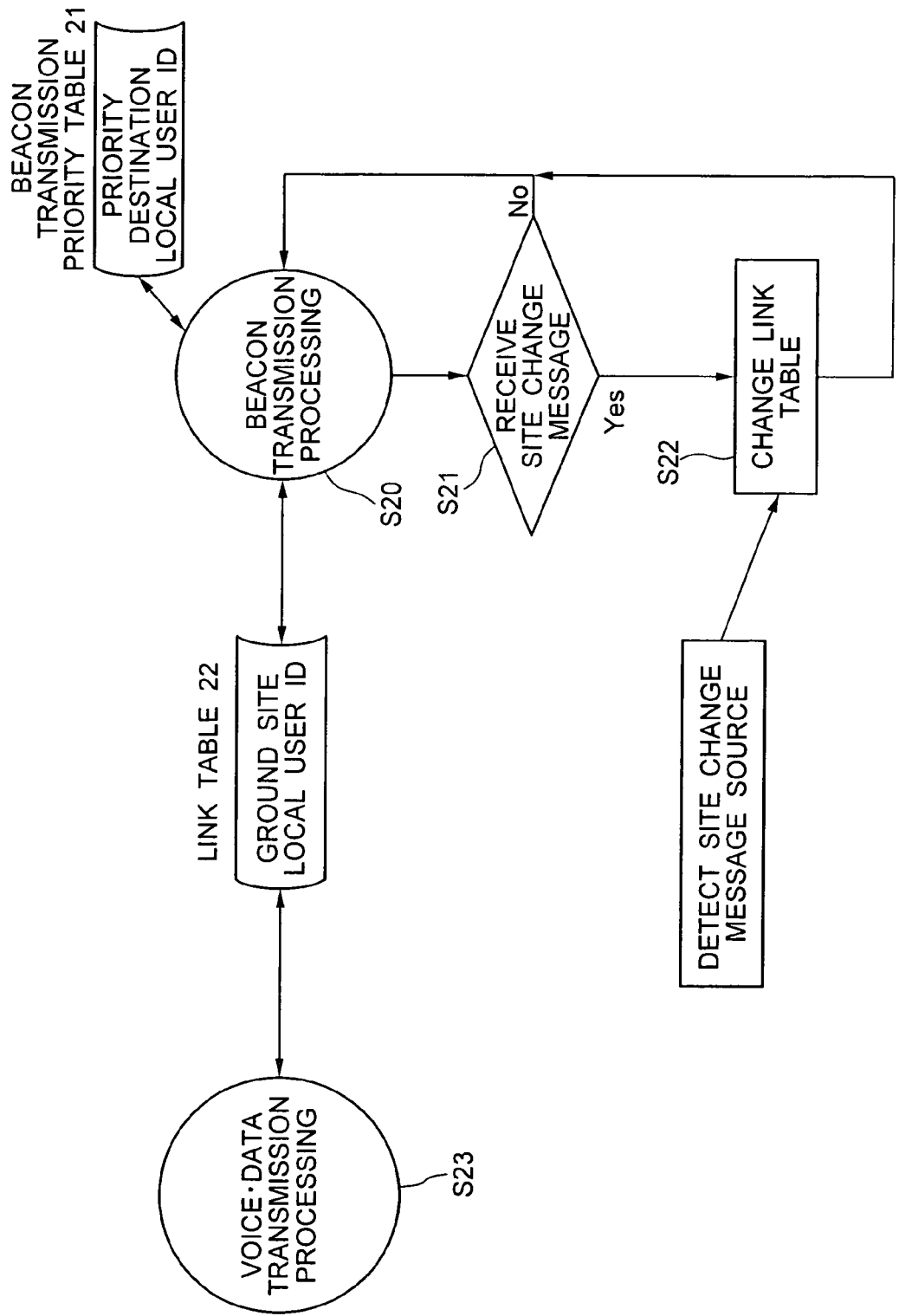
FIG. 7 is a flowchart for explaining beacon processing for managing a link connection between a ground station and an airborne station.

As shown in FIG. 7, the ground station 2 includes a beacon transmission priority table 21 and a link table 22. The beacon transmission priority table 21 contains priority destination data and local user ID in an associating manner. The link table 22 contains the local user ID of the linked airborne station 4, and information of the ground site 3 which is the current site of the airborne station 4 in an associating manner.

As shown in FIG. 7, the ground station 2 refers to the beacon transmission priority table 21 and the link table 22 so as to transmit a beacon signal for polling processing or the like to the airborne station 4 via the ground site 3 (step S20). Then, the ground station 2 monitors reception of a site change message from the airborne station 4 (step S21). If the site change message is not received (NO in step S21), the ground station 2 again refers to the beacon transmission priority table 21 and the link table 22 so as to transmit a beacon signal for polling processing or the like to the airborne station 4 via the ground site 3 (step S20).

When the ground station 2 receives a site change message MSG from the airborne station 4 (step S21), the ground station 2 changes contents of the link table 22 (step S22). In this case, the ground site 3 associates the airborne station 4 which transmitted the site change message MSG with current site information which is the site change message transferred to the ground station 2, and writes the information into the link table 22 (step S22).

The downlink message shown in FIG. 5 is desirably performed in the format (FIG. 5) and an algorithm similar to those of data reservation request. This is because the downlink message is a random access transmission, so there is a case where the ground station 2 cannot receive it due to data collision.

In a specific example relating to the downlink message format shown in FIG. 5, if there is a data reservation request in the airborne station 4 when the current site is changed, the required number of the slot request number is included as the conventional case, and reservation request message transmission is performed. On the other hand, if there is no data reservation request in the airborne station 4 and it is a message only for changing the current site, "0" is filled in as the number of slots, and reservation request transmission is performed.

Further, the site change message from the airborne station 4 is securely transmitted to the ground station 2 by using the algorithm same as that of the reservation request. That is, in order to stop transmission of the site change message, "RACK" from the ground site 3b which is the current site or "polling reception" is required.

In order to enable the operation described above, further devices are required. Even though the airborne radio of the airborne station 4 receives information of a ground station code (GSC) having a different value, it must be treated as an effective beacon signal. This will be explained later.

Further, a change of the ground site 3 by the current site message is not limited to beacon processing, but is also able to be applied to all transmission data (voice, data) from the ground side (step S23).

(Positioning Location Measurement)

In the embodiment of the present invention, distance calculation between the aircraft 1 and the ground site 3 becomes possible based on information for knowing the current site. That is, although it is possible to obtain propagation delay by squelch window processing respectively, the distance between an aircraft and a site can be obtained accurately by knowing the current site. Based on FIG. 8, positioning location measurement will be explained.

Figure 8:
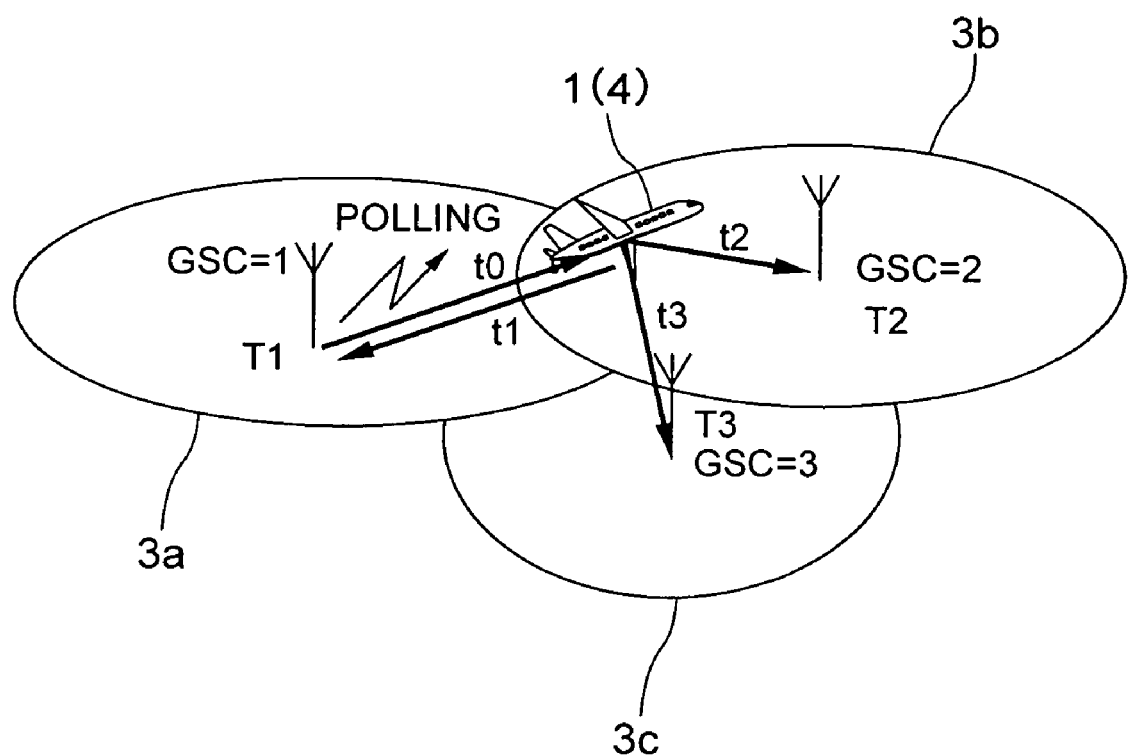
FIG. 8 is an illustration for explaining positioning of a distance to an airborne station.

It is assumed that three ground sites 3a, 3b and 3c shown in FIG. 8 are located at positions where they are capable of receiving from the airborne station 4 of the aircraft 1, respectively, and the current site for the airborne station 4 is the site 3a, and delay times between the respective ground sites 3a, 3b and 3c and the airborne station 4 are T1 for the site 3a, T2 for the site 3b and T3 for the site 3c.

In FIG. 8, t0 shows a gap between the system timing of the airborne station 4 and the reference timing (±1 symbol), which conforms to propagation delay between the airborne station 4 and the current site. t1 is propagation delay between the airborne station 4 and the site 3a. Similarly, t2 and t3 are propagation delay between the airborne station 4 and the site 3b, and between the airborne station 4 and the site 3c, respectively. They are in the relationships of T1=t0+t1, T2=t0+t2 and T3=t0+t3.

If the ground stations 2a and 2b cannot determine the current site with respect to the airborne station 4, each of the ground stations 2a and 2b must determine the current site among ground sites included in the station of itself.

In the embodiment of the present invention, the ground site 2 performs positioning location measurement based on the above-described information. That is, distances d1, d2 and d3 between the aircraft 1 and the ground sites 3a, 3b and 3c are calculated from equations d1=T1/2*C, d2=T2/2*C and d3=T3/2*C, respectively. Here, C is a light velocity.

Therefore, an error of (t1−t0)/2 will be caused in the ground site 3a, (t2−t0)/2 will be caused in the ground site 3b, and (t3−t0)/2 will be caused in the ground site 3c.

On the other hand, if the current site is recognized by the ground station code (GSC), it is possible to know in which site the accurate distance has been observed, so accurate positioning measurement is possible by three point measurement.

For example, since T1=t0+t1, the distance to the airborne station 4 is calculated from a formula of (T1/2)/C. The delay time of T2 is t0+t2, so the distance between the site 3b and the aircraft 1 is calculated from t2=T2−t0.

Similarly, t3=T3−t0, so the distance between the site 3c and the aircraft 1 is calculated, and since all distances from t0 to t3 and the distances to the sites 3a, 3b and 3c have been known, positioning measurement of the aircraft 1 is performed.

(Airborne Station Voice Transmission Suppression)

In the site diversity operation, it is impossible to transmit beacon signals indicating "voice occupied" from a plurality of ground sites simultaneously, so a case where an antiblocking function does not work effectively may be caused.

Here, an anti-blocking function will be explained. In VDL Mode 3, radio wave is outputted from the ground station 2 to the airborne station 4 so as to notify whether a voice channel is not in use, by using voice areas of two slots (V/D burst) and an area of management burst added to the head part of each slot. With this radio wave, the airborne station 4 recognizes that a talk is possible since the channel is not in use. However, this is information not heard as audible voice to the pilot of the airborne station 4, so the pilot determines whether a talk is possible or not when he presses a press-to-talk. If a talk is impossible, the pilot will wait for the channel to open. VDL Mode 3 has functions of giving priority to voice which is reached first, and transmitting voice from the ground station 2 by priority and forcibly eliminating voice communications from the airborne station 4. These are called an anti-blocking function and an air traffic controller priority voice function, respectively. The anti-blocking function is performed based on beacon signals transmitted from a plurality of ground sites 3 under the control of the ground station 2.

In the embodiment of the present invention, as measures against a case where the anti-blocking function does not work effectively, the ground site 3a forcibly performs "voice stop instruction" with a voice occupying beacon signal to the airborne station 4a (1a) which transmitted an airborne station voice to the ground site 3a later.

That is, the ground station 2 in the embodiment of the present invention identifies the ground site which is in the connected relationship with the aircraft 1 (airborne station 4) in real time, and performs a voice control for each area of the ground site.

Figure 9:
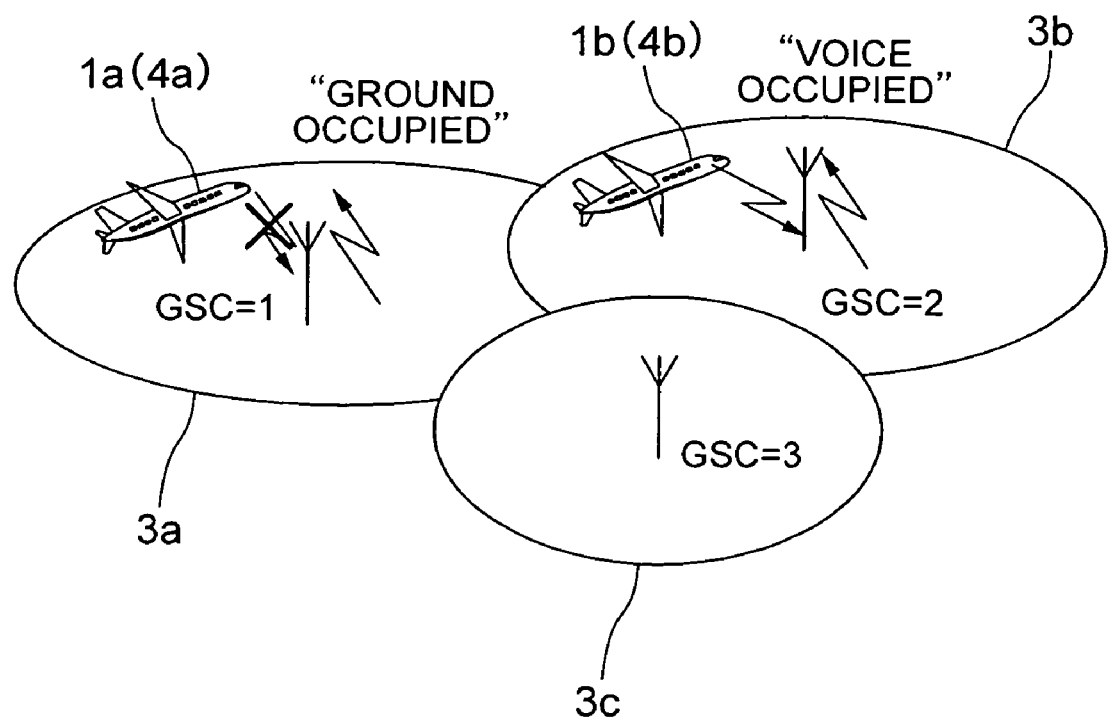
FIG. 9 is an illustration for explaining a stop of voice transmission.
Figure 10:
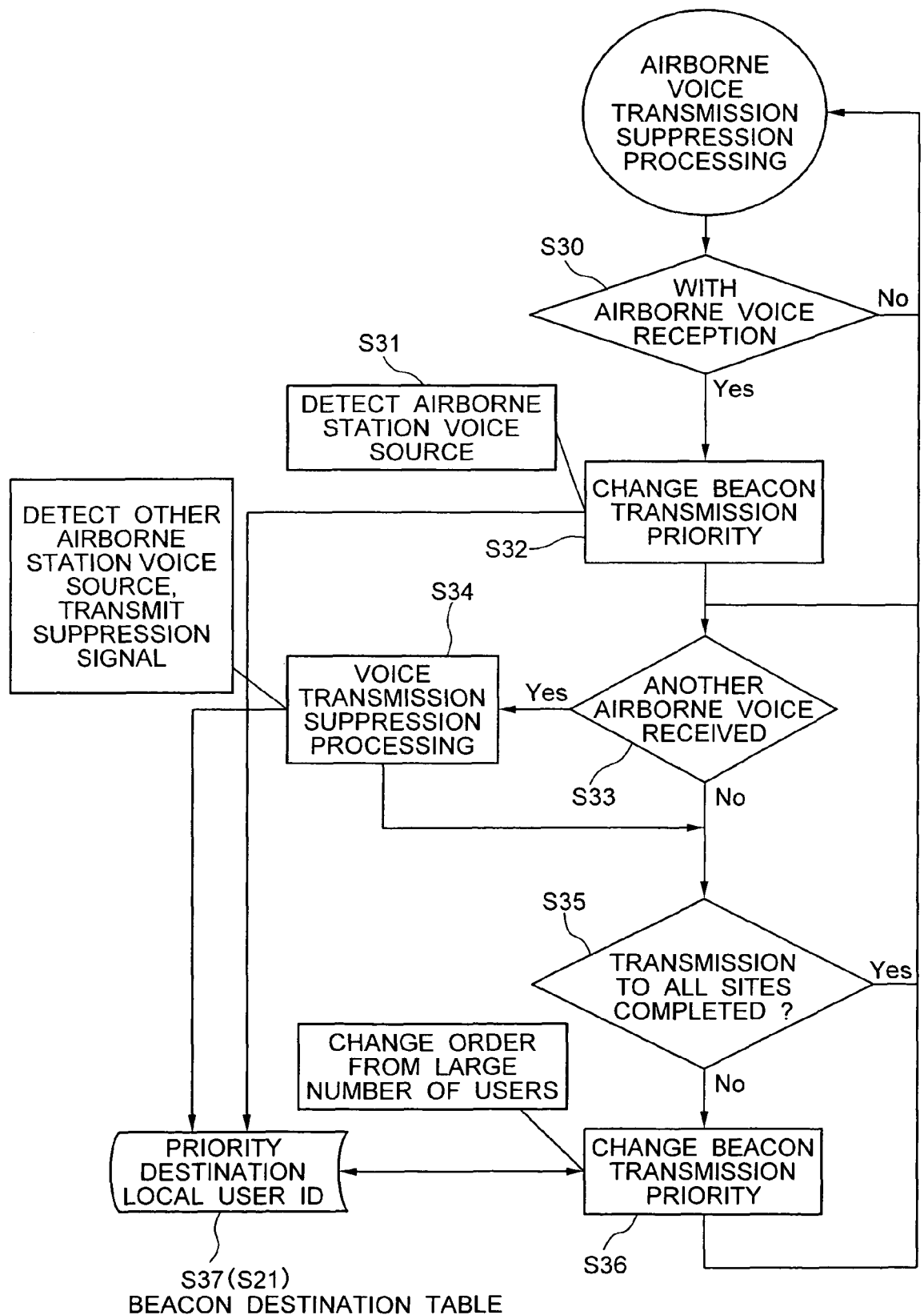
FIG. 10 is a flowchart for explaining voice suppression processing.

More specifically, as shown in FIG. 9, explanation will be given based on an example in which when a first airborne station 4a is located in the ground site 3a and a second airborne station 4b is located in the ground site 3b and voice communications are to be performed between the airborne stations 4a and 4b and the ground station 2, voice transmission by the one airborne station 4b is allowed and voice transmission by the other airborne station 4a is suppressed. FIG. 10 shows suppressing processing of voice transmission by the airborne station.

Based on the beacon processing described above, the ground station 2 performs priority processing for beacon transmission, and further performs devices for the anti-blocking processing for the site diversity operation. FIG. 10 shows a part of inner processing of the beacon processing S20 of FIG. 7. If there is no downlink data from the ground site 3, beacon transmission processing is performed sequentially through three ground sites 3a, 3b and 3c. At the same time, the ground station 2 monitors voice reception from the airborne station 4 via the ground site 3 (step S30 in FIG. 10). If there is no voice transmission (step S30 in FIG. 10; NO), general beacon processing S20 will be performed again.

When the airborne station 4b transmitted voice to the ground station 2 first (step S30 in FIG. 10; YES), the ground station 2 recognizes, by the ground station code GSC of voice burst, that the voice was received by the ground site 3b which is the subject of linking with the airborne station 4b, and detects that the airborne station performed the voice transmission is the second airborne station 4b.

Then, the ground station 2 changes the next beacon transmission to the ground site 3b by priority in order that voice of the airborne station 4b will not be interfered by an airborne station 4 which may exist in the same ground site 3b so as to continue the voice transmission by the airborne station 4b (step S32 in FIG. 10, in practice, beacon transmission priority table 21 in FIG. 7 is rewritten by priority), and performs beacon transmission of "voice occupied" from the ground site 3b to the airborne station 4b.

When voice transmission is performed from the airborne station 4b via the ground site 3b in response to the beacon transmission of "voice occupied" from the ground station 2, a voice link is established between the airborne station 4b and the ground station 2. In order to further maintain the voice link with the airborne station 4b, the ground station 2 monitors whether any voice is received or not from another airborne station 4a (step S33 in FIG. 10). If, the ground station 2 receives voice from another airborne station 4a via the ground site 3a (before beacon transmission takes a round), the ground station 2 performs beacon transmission including information of "ground occupied" to the other airborne station 4a via the ground site 3a to thereby suppress voice transmission to the other airborne station 4a (step S34 in FIG. 10, 21 in FIG. 7 is rewritten similarly). This is performed by giving priority to the ground station voice, so not only "ground occupied" but a similar method is acceptable.

In step S33, if voice transmission from the other airborne station 4a is not received (step S33; NO), the ground station 2 determines whether suppression signals of voice transmission ("voice occupied") have been transmitted from all ground sites 3a, 3b and 3c (step S35), and performs changing processing so as to perform beacon transmission including "voice occupied" from the ground site 3 in the descending order of the numbers of airborne stations 4 connecting with one ground site 3 (step S36). At the same time, the link table 22 shown in FIG. 7 is rewritten (step S37). This is because the fact that the probability of voice transmission becomes large as the number of aircrafts 1 increases, so it is required to suppress earlier.

Relating to voice transmission and timing maintenance, the ICAO manual defines that timing change of voice transmission should not be performed during a transmission period. This is also applied to the site diversity operation. To the aircraft performing voice transmission, the current site should not be changed during the voice transmitting period. This is because, on the receiving side, the voice squelch window value is reduced to ±1 symbol after starting voice reception, so timing change of the airborne station is not determined as appropriate voice data, which may cause a state where voice reception is impossible. In addition, this is also applied to a case during data transmission and a case of waiting for response data from the ground station 2 with respect to downlink data.

(Review of Voice Squelch Window and Effective Window)

Figure 11:
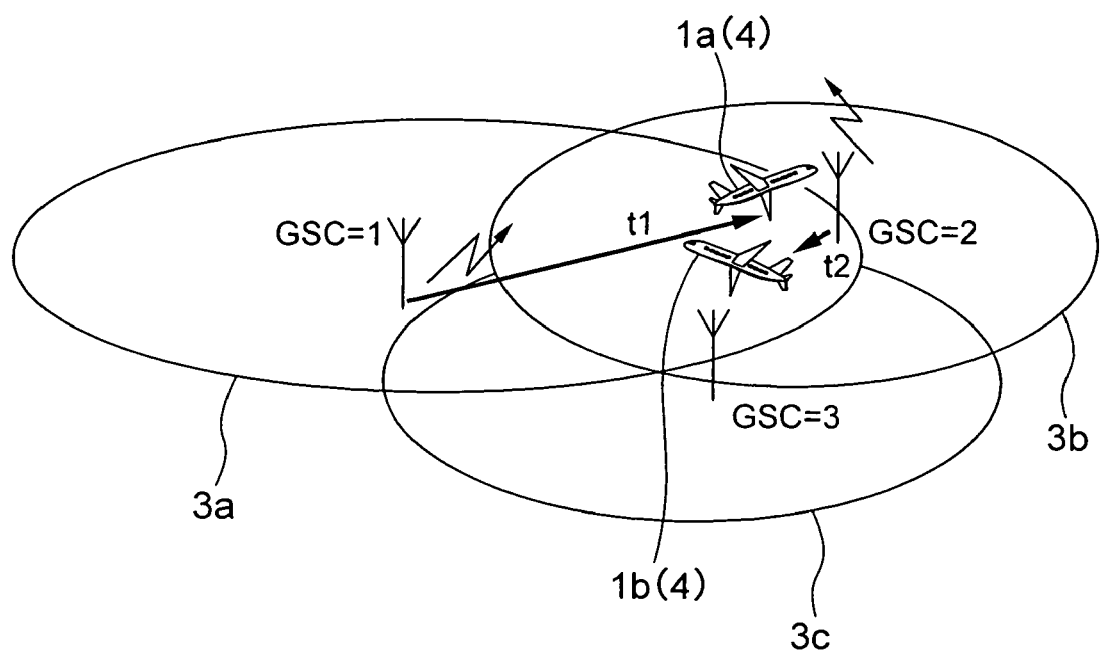
FIG. 11 is an illustration for considering a current site.

The example shown in FIG. 11 shows a state where the site diversity operation is performed by the three ground sites 3a, 3b and 3c. There is an overlapped part, shown by oblique lines, in all covering areas of the ground sites 3a, 3b and 3c. Such a state of the ground sites happens when the routes of the aircrafts 1a and 1b are in directions opposite each other.

The aircraft 1a is guided in a direction from the ground site 3a to the ground site 3b, and is positioned near 200 NM at the end of the radio wave covering area by the ground site 3a. Further, the aircraft 1a is in the radio wave covering area range of the ground sites 3b and 3c, and is positioned within 200 NM of the radio wave covering area of the ground sites 3b and 3c.

The aircraft 1b is guided in a direction from the ground site 3b to the ground site 3a, and is substantially positioned immediately above the ground site 3b. Further, the aircraft 1b is within the radio wave covering range of the ground sites 3a and 3b, and is positioned within 200 NM of the radio wave covering area of the ground sites 3a and 3b.

A current site in the positioning relationship between the aircrafts 1a and 1b shown in FIG. 11 will be considered.

By the site diversity operation using the three ground sites 3a, 3b and 3c having an overlapped part, an interval (BC) of rotation for transmitting beacon signals is 6 MAC (2 MAC by 3), generally.

Figure 12:
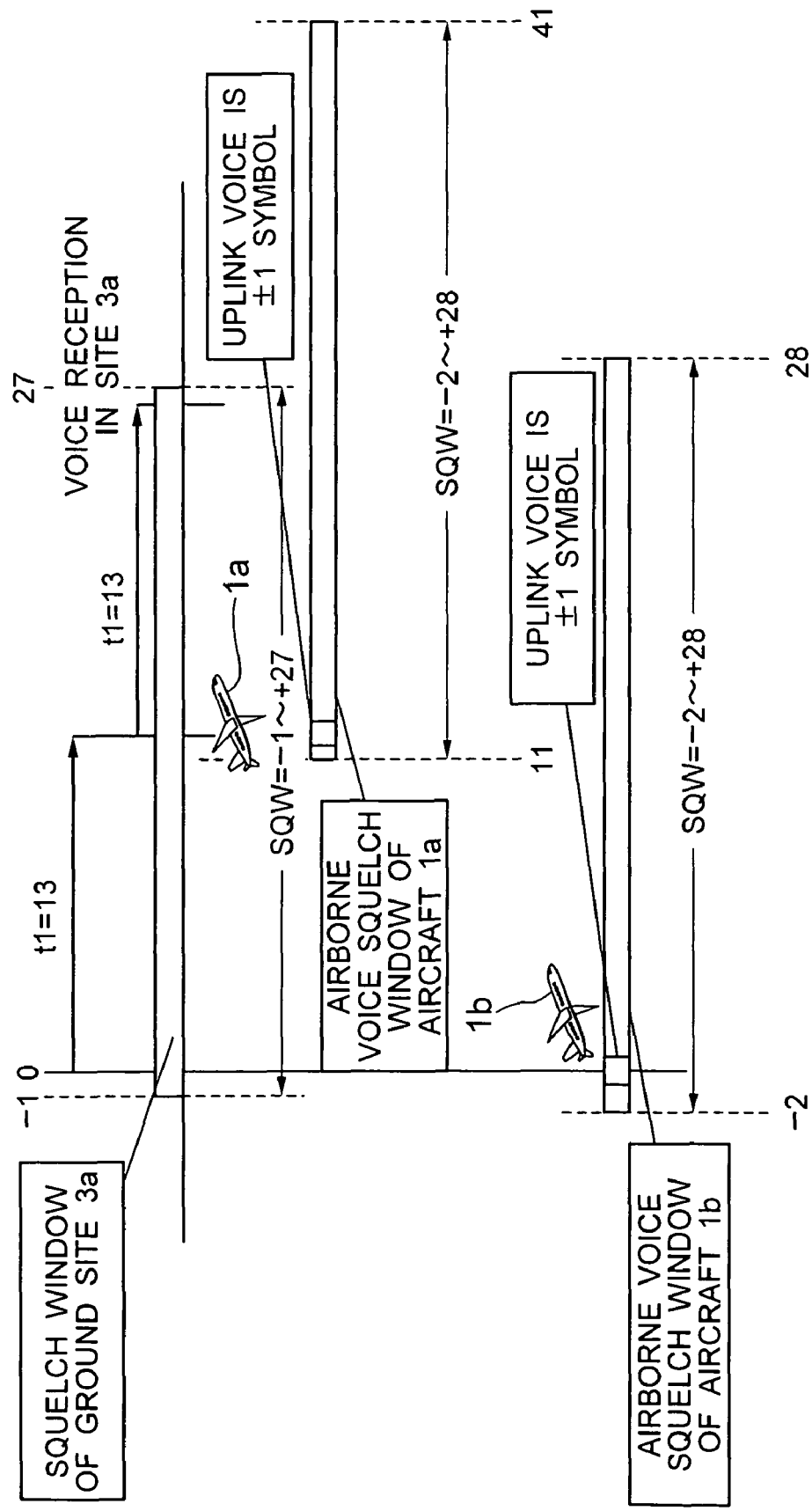
FIG. 12 is a diagram for explaining a review of a squelch window.

Voice transmission and reception in a state where voice is transmitted from the aircraft 1a in FIG. 11 will be considered. As shown in FIG. 12, the aircraft 1a is positioned at 200 NM to the current site 3a, so it is synchronized with the current site 3a with ±13 symbol delay. Therefore, timing of receiving voice from the aircraft 1a by the current site 3a is after 26 symbols, which is further delayed by 13 symbols as shown in FIG. 12.

Since the squelch window value (n) of 200 NM range is "6", the squelch window (SQW) of the ground site 3 becomes a −1 to 27 symbol block, as shown in FIG. 12. Therefore, voice from the aircraft 1a positioned at 200 NM within the ground site 3a is receivable by the three ground sites 3a to 3c.

An aircraft spaced apart by 200 NM is synchronized with the current site with a delay of 13 symbols (propagation delay at the time of 200 NM), so on the ground side, reception starts with a delay of 26 symbols, which is twice as large as 13 symbols described above. When a timing error of ±1 symbol is added, it conforms to the squelch window value.

A consideration will be given for a receiving state in which the system timing of the aircraft 1b is same as the system timing of the ground site.

The ground site 3b which is the current site for the aircraft 1b is capable of receiving voice with almost no delay. On the other hand, in the ground site 3a, the aircraft 1b positioned at a distance of about 200 NM is in the radio wave covering area, so voice is received with a delay of 13 symbols which is the transmission delay of 200 NM. Each one conforms to −1 to +27 symbol block of the squelch window (SQW) of the ground site.

The squelch window (SQW) of the aircraft 1a becomes a 11 to 41 symbol block with respect to the absolute time. Therefore, a voice signal from the aircraft 1b transmitted at the absolute time 0 is ineffective, so it is not received by the aircraft 1a.

As described above, voice transmission from the aircraft 1a is receivable by both the aircraft 1b and the ground site, but a voice signal from the aircraft 1b is in a state which cannot be received by the aircraft 1a.

The squelch window (SQW) of uplink voice of the airborne station 4 (aircraft 1a) in the system timing TS1 is reduced to ±1 symbol. Therefore, the airborne station 4 of the aircraft 1a seldom receives voice other than those transmitted from the current site. Signals receivable by the airborne station 4 are signals only from the ground site 3a within a distance of ±15 NM from the current site, viewed from the airborne station 4.

Therefore, voice transmission from the ground site 3a is receivable only by the aircraft 1a, and the aircraft 1a cannot receive voice from the ground site 3b. Similarly, voice transmission from the ground site 3b is in a state where it is receivable by the aircraft 1b but not receivable by the aircraft 1a.

This will prevent voice information from being shared in the same sector, and will become an operational mode different from the current analog radio system. Further, in the current state where an air traffic controller selects a ground site in an experimental manner based on a radar screen and provides a voice service, an event which is different from the ground site to be received will be caused.

This is allowed for voice communications outside the radio wave covering area. However, such an event should be avoided in the almost same location within the radio wave covering area.

A cause of voice communications being impossible between airborne stations is that the current squelch window value is not expected to be received at timing earlier than the system timing of the airborne station.

For solving this problem, it is only necessary that an airborne station is adapted to always synchronize with a near ground site. In order to do so, it is required to cause the ground station code GSC to be disregarded at the time of beacon check, or to use the same ground station code GSC, as described above. In the latter case, however, there is a problem that the current site cannot be identified accurately.

Further, another cause that voice is not received even though voice transmission from a ground site is performed within the radio wave covering area is a fact that uplink voice transmission from a site other than the current site is not expected (site diversity operation is not considered), so the squelch window value is fixed to ±1 symbol.

In order to solve this problem, in the embodiment of the present invention, the squelch window value of the uplink voice reception is expanded only at the time of site diversity operation. As an example, if the covering area of a substitute site is allowed up to 200 NM, a delay of 13 symbols is caused, so it is expanded to −2 to 2(n+1) (n: squelch window value).

An explanation will be given for a case where voice reception processing is performed by expanding the voice receiving squelch window of the airborne station 4 based on FIG. 3. As shown in FIG. 3, parameters of the squelch window of voice reception are changed on the airborne station 4 side (step S9). This processing is performed for causing the airborne station 4 to receive voice transmitted from the ground station 2 via a ground site 3 other than the current site linked with the airborne station 4.

If the airborne station 4 cannot receive voice from the ground station 2 (step S10; NO), parameters of the squelch window is again changed on the airborne station 4 side.

If the airborne station 4 could receive voice from the ground station 2 (step S10; YES), then, ground voice receiving processing will be performed (step S11). When the ground voice receiving processing is performed, the airborne station 4 is linked with a ground site 3 other than the current site. Since the airborne station 4 has changed the ground site 3 to be linked, a site change message indicating that the site has been changed is transmitted from the airborne station 4 to the ground station 2. Based on this message, the ground station 2 grasps the new ground site 3 to be linked with the airborne station.

Next, identification of a site diversity operation will be considered. In the case of an operation by a single ground site, if a different ground station code GSC is received at any time, there is a possibility of being synchronized with a fault beacon signal. Therefore, it is required to notify the airborne radio of identification whether it is a single ground site operation or a site diversity operation.

In the method of identifying site diversity according to the embodiment of the present invention, a support option message exchanged in the network participating sequence shown in FIG. 2 is used for identification. More specifically, as shown in FIG. 13, the sixth bit of the octet 5 of a support option message is allocated, and a field for incorporating information of a site diversity service is set to the sixth bit, and based on this information, identification of site diversity is performed.

In the explanation described above, there has been described a method of performing site diversity operation in which a channel is divided into a plurality of slots by time division multiple access, and voice and data are transmitted between controlling stations and controlled stations via a plurality of sites through these slots, whereby controlled stations are controlled based on instructions from controlling stations. However, this operating method may be made into a program so as to drive computers incorporated in ground stations (controlling stations) 2 and airborne stations (controlled stations) 4.

In such a case, functions based on the message formats shown in FIGS. 2 and 5 and the flowcharts shown in FIGS. 3 and 7 are made into a program. More specifically, the functions are constructed as a program for performing site diversity operation in which a channel is divided into a plurality of slots by time division multiple access, and voice and data are transmitted between controlling stations and controlled stations via a plurality of sites through these slots, whereby controlled stations are controlled based on instructions from controlling stations, and are configured such that a site change message indicating that the controlled station 4 has changed the site 3 is transmitted from the controlled station 4 to the controlling station 2, and based on the transmitted information, the computer is prompted by electric signals to execute a function of searching for the current site, on the controlling station 2 side.

Further, the program may be so constructed as to prompt a computer by electric signals to perform a function in which the voice receiving squelch window of the controlled station 4 is expanded, and a signal transmitted from the controlling station 2 via a site having different site identification code is received by the controlled station 4, and timing that the controlled station 4 links the controlling station 2 is changed. In such a case, it is desirable to be constructed to have a configuration for prompting a computer by electric signals to execute a function in which when the controlled station 4 receives a signal from the site 3 having a different site identification code, the controlled station 4 transmits a site change message to the controlling station 2 indicating that the site has been changed.

Although, in the embodiment described above, a case of applying the site diversity operating method according to the embodiment of the present invention to air traffic control has been explained, the present invention is not limited to this. The present invention is applicable to any system in which controlling stations and controlled stations exist, and controlled stations are under the control of controlling stations, and controlled stations are controlled based on the control by controlling stations.

INDUSTRIAL APPLICABILITY

As described above, according to the present invention, it is possible to perform an operation effective for site diversity, and to solve a problem of delay in communications between controlling stations and controlled stations.

What is claimed is:

1. A site diversity operating method in which a channel is divided into a plurality of slots by time division multiple access, and voice and data are transmitted between a controlling station and a controlled station via a plurality of sites through the slots whereby the controlled station is controlled based on an instruction from the controlling station, the method comprising:
    the controlled station transmitting to the controlling station a site change message indicating that the controlled station has changed from a first site to a second site, the site change message including information about a ground station code that has been changed, provided that a beacon signal from the first site cannot be received within ±1 symbols and response processing with the first site has ended; and
    the controlling station receiving the transmitted site change message, extracting the information about the ground station code from the transmitted site change message, and recognizing that the controlled station has changed to the second site.

2. The site diversity operating method, as claimed in claim 1, wherein site identification codes are assigned to each site of the plurality of sites, and based on the site identification codes, the controlled station is controlled by the controlling station through a site of the plurality of sites.

3. The site diversity operating method, as claimed in claim 1, wherein a voice receiving squelch window of the controlled station is expanded such that a signal transmitted from the controlling station via the second site, which has a different site identification code than the first site, is received by the controlled station, whereby timing that the controlled station links the controlling station is changed.

4. The site diversity operating method, as claimed in claim 3, wherein when the controlled station receives a signal from the second site, the controlled station transmits the site change message to the controlling station indicating that the controlled station has changed the site.

5. The site diversity operating method, as claimed in claim 1, wherein identification of a site diversity operation is performed by a support option message used for linking the controlling station and the controlled station.

6. The site diversity operating method, as claimed in claim 1, further comprising prioritizing voice transmission from the controlled station to the controlling station, and suppressing voice transmission corresponding to the priority, when site diversity operation is performed in an area where radio wave covering areas of the plurality of sites are overlapped.

7. The site diversity operating method, as claimed in claim 6, wherein the suppressing comprises:
    setting the priority corresponding to whether voice communication from the controlled station to the controlling station has started;
    allowing only voice transmission of high priority; and
    suppressing voice transmission of low priority.

* * * * *